(12) United States Patent
Martens et al.

(10) Patent No.: US 6,774,174 B2
(45) Date of Patent: Aug. 10, 2004

(54) FLAME-RETARDANT POLYAMIDE COMPOSITIONS

(75) Inventors: Marvin Michael Martens, Vienna, WV (US); Reiko Koshida, Utsunomiya (JP); Jennifer L. Bohan, Lafayette, IN (US); William Ray Fielding, West Lafayette, IN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 39 days.

(21) Appl. No.: 09/957,798

(22) Filed: Sep. 21, 2001

(65) Prior Publication Data

US 2002/0103281 A1 Aug. 1, 2002

Related U.S. Application Data

(60) Provisional application No. 60/234,620, filed on Sep. 22, 2000.

(51) Int. Cl.[7] .................... C08L 77/00; C08L 25/18
(52) U.S. Cl. .................. 524/514; 524/404; 524/412; 524/430; 525/183
(58) Field of Search ............... 524/514, 404, 524/412, 430, 494; 525/183

(56) References Cited

U.S. PATENT DOCUMENTS

| | | | |
|---|---|---|---|
| 5,210,134 A | | 5/1993 | Akkapeddi et al. |
| 5,258,439 A | | 11/1993 | Togashi et al. |
| 5,354,802 A | * | 10/1994 | Shiwaku et al. ............ 524/494 |
| 5,369,202 A | | 11/1994 | Atwell et al. |
| 5,543,452 A | | 8/1996 | Nakahashi et al. |
| 5,565,538 A | | 10/1996 | Zingde et al. |
| 5,814,384 A | | 9/1998 | Akkapeddi et al. |
| 5,990,244 A | | 11/1999 | Warakomski et al. |
| 6,037,401 A | | 3/2000 | Tijssen |
| 6,140,459 A | | 10/2000 | Leboeuf et al. |
| 6,146,555 A | | 11/2000 | Gill et al. |
| 6,288,145 B1 | | 9/2001 | Miyabo |
| 6,414,064 B1 | | 7/2002 | Matsuoka |
| 2002/0086928 A1 | | 7/2002 | Ouchi |

FOREIGN PATENT DOCUMENTS

| | | |
|---|---|---|
| EP | 288 269 B1 | 9/1992 |
| EP | 0 734 413 B1 | 3/1999 |
| EP | 0 999 235 A1 | 5/2000 |
| EP | 999 235 A1 | 5/2000 |
| WO | WO 96/09329 A1 | 3/1996 |
| WO | WO 98/29512 * | 7/1998 |
| WO | WO 01/42364 | 6/2001 |

OTHER PUBLICATIONS

I. Park, J. Barlow, D. Paul, "The In Situ Reactive Compatibilization of Nylon–6/Polystyrene Blends Using Anhydride Functionalized Polystyrenes", Journal of Polymer Sequence Part B: Polymer Physics. vol. 30, pp 1021, Jan., 1992.

Journal of Vinyl & Additive Technology, Sep., 1997, vol. 3, No. 3, Functional Copolymers of Dibromostyrene as Flame Retardants for thermoplastic Polyamides and Ppolyesters, W. Fielding, J. Elliott.

W. Fielding, J. Elliott, "Functional Copolymers of Dibromostyrene as Flame Retardants for Thermoplastic Polyamides and Polyesters", Journal of vinyl & Additive Technology, Sep. 1997, vol. 3, No. 3.

* cited by examiner

Primary Examiner—Peter Szekely

(57) ABSTRACT

This invention deals with the development of improved SMT performance flame retardant polyamide compositions. The compositions include replacing the poly bromostyrene or brominated polystyrene with a copolymer of a halostyrene and glycidyl(meth)acrylate. The resulting composition results in greatly improved blistering performance in Surface Mounting Technology Applications.

12 Claims, No Drawings

FLAME-RETARDANT POLYAMIDE COMPOSITIONS

This application claims benefit of Provisional Application No. 60/234,620 filed Sep. 22, 2000.

FIELD OF THE INVENTION

The present invention relates to flame retarded high temperature (>280C.) polyamide compositions. More specifically, the present invention relates to reinforced high temperature polyamides including flame retardant (a copolymer of a halostyrene and glycidyl(meth)acrylate), and which are useful in Surface Mount Technology (SMT) applications among others.

BACKGROUND OF THE INVENTION

Flame retarded high temperature polyamides have been used in SMT applications for several years. However because of the absorption of water associated with these polymers, voids are formed therein when they are heated in ovens during processing. The resulting parts are consequently undesirably deformed.

In response to these concerns, high temperature polyamides incorporating flame-retardants have been used and are generally satisfactory for conventional applications. However, there is increasingly a demand for higher melt temperature solder materials that have more stringent property requirements than those of current polyamides in the industry.

A need exists for a high temperature flame retarded polyamide that can withstand higher oven temperatures without the formation of voids and the deformation of plastic parts molded therefrom.

SUMMARY OF THE INVENTION

There is disclosed and claimed herein flame retarded, reinforced high temperature polyamide compositions comprising:

1) about 30 to about 70 weight percent of polyamide with a melt temperature above 280C.;
2) about 5 to about 50 weight percent of reinforcing agent;
3) about 10 to about 30 weight percent of a copolymer of glycidyl(meth)acrylate and bromostyrene ; and,
4) About 1 to 6 weight percent of flame retardant synergist.

In preferred embodiments of the invention, the glycidyl (meth)acrylate is present in amounts of 0.1–15.0 (most preferably 0.3–5.0) weight percent and the bromostyrene is complementally present in the range of 85.0–99.9 (most preferably 95.0–99.7) weight percent in the copolymer; and further the amount of bromine in the copolymer is in the range of 58–70 (most preferably 59–68) weight percent.

The compositions of the invention may optionally contain up to 2 weight percent of a mold release agent and up to 2 weight percent of a heat stabilizer. Moreover, suitable compositions may also contain up to 5 weight percent of toughener (such as rubber, polyethylene, polypropylene, and Surlyn ® ionomer (available from EI DuPont de Nemours and Co.)).

Without intending to limit the generality of the foregoing, any number of nylons, reinforcing agents, synergists and additives may be selected by those of skill in the art and are considered within the scope of this invention. For example, polyamides according to the invention include 9T, 10T, 12T, 46, 6T/66, and 6T/DT, among others. Suitable reinforcing agents include glass or mineral, and flame retardant synergists may be selected from any of antimony trioxide, antimony pentoxide, sodium antimonate, zinc borate and the like. A variety of mold release agents are useful for purposes of this invention, and include wax OP and PED 521, which are commercially available lubricants from Hoechst Celanese AG. Finally, there is a wide range of useful heat stabilizers as can be selected by those having skill in the art, such as CuI.

DETAILED DESCRIPTION OF THE INVENTION

Conventional high temperature, reinforced, flame retarded polyamides use a high melt temperature (>280 C.) polyamide, reinforcing agent (typically fiber glass or mineral), lubricants/mold release agents, heat stabilizers, flame retardant (brominated polystyrene or poly (bromostyrene)), and a flame retardant synergist (typical antimony pentoxide, antimony trioxide, sodium antimonate or Zinc Borate).

In contrast, in this invention the flame retardant (brominated polystyrene or poly (bromostyrene)) was replaced with a copolymer of a halostyrene and glycidyl (meth)acrylate.

Preferably the glycidyl(meth)acrylate flame retardant additive is a random copolymer of a bromostyrene (mono, di- and tri-bromo) [DBS] and glycidyl(meth)acrylate [GMA]. The material used in the examples herein was available under the trade name CP-44 manufactured by the Great Lakes Chemical Co., West Lafayette, Ind. The additive is also described in U.S. Pat. No. 5,565,538, which is incorporated by reference herein.

The replacement of the poly bromostyrene or brominated polystyrene with the CP-44 (poly bromostyrene/glycidyl (meth)acrylate) copolymer yields a significant 5–25 C. or better improvement in the SMT blistering temperature which makes the flame retardant polyamides much more suitable for SMT applications.

EXAMPLES

The invention will become better understood and appreciated upon having reference to the following Examples and Comparative Examples. In each instance the resin mixtures were extruded on 30 mm, 40 mm and 58 mm Werner and Pfleider twin-screw extruders, under standard conditions readily appreciated by those of ordinary skill in the art. Rates for the various size machines were 30, 200 and 600 pph respectively. After exiting the extruder, the polymer was passed through dies to make strands, frozen in a quench tank and the strands were chopped to make pellets.

In all cases the total amount of bromine in the final product was kept constant as the different flame-retardants were tested. The flame retardant level only varied as the reinforcing agent level was adjusted. The polyamide selected was a nylon 6T/66 copolymer with a meltpoint of 304 C. nominally. Glass was selected as the reinforcing agent, and zinc borate (abbreviated "ZB" in the table) was the flame retardant synergist. The mold release agent (abbreviated "Mold rel." in the table) consisted of 0.25 weight percent wax OP and 0.20 weight percent PED 521.

The compounded flame retarded product was molded in typical laboratory size molding machines into standard 1/32" ASTM flex bars. These flex bars where then tested per UL94 vertical burn test procedures.

Some of these bars were also tested for SMT performance. More specifically, the temperature at which voids are formed in the bar and deformation occurs is known as the "blistering temperature". (The blistering is typically caused by a volatile (like water) which vaporizes during SMT heating and causes "blisters" in the part.) The SMT testing is done by conditioning the bars at 40 C. for 168 hours at 90% relative humidity. The moisture was then confirmed to be in the range of 2–3% moisture to simulate the conditions that the products are exposed to during storage. These conditioned bars are then passed through a Heller 1088 Total Forced Convection Surface Mount Reflow System. The peak temperature of the part (measured by a thermocouple on the part) without "blistering" is recorded as the maximum SMT temperature. Because the temperature readings for this test were taken in 5 C. increments, the testing was conducted on these bars until the "blistering temperature" (as described above) was reached, and the peak temperature without blistering was recorded as the previous temperature increment. All samples are UL-94 V0-rated at 1/32". The results are shown in table 1.

What is claimed is:

1. A flame retarded, reinforced high temperature polyamide composition comprising:
   1) about 30 to about 70 weight percent of polyamide with a melt temperature above 280 C.;
   2) about 5 to about 50 weight percent of reinforcing agent;
   3) about 10 to about 30 weight percent of a copolymer of glycidyl(meth)acrylate and bromostyrene; and,
   4) About 1 to 6 weight percent of flame retardant synergist.

2. The composition of claim 1 further comprising up to 2 weight percent of a mold release agent.

3. The composition of claim 1 further comprising up to 2 weight percent of a heat stabilizer.

4. The composition of claim 1 further comprising up to 5 weight percent of toughener.

5. The composition of claim 4 wherein said toughener is selected from the group consisting of rubber, polyethylene, polypropylene, and Ionomeric copolymer.

6. The composition of claim 1 wherein said polyamide is selected from the group consisting of 9T through 12T, nylon-4, 6, nylon-6T/66, and nylon 6T/DT.

7. The composition of claim 1 wherein said reinforcing agent is glass or mineral.

8. The composition of claim 1 wherein said flame retardant synergist is selected from the group consisting of antimony trioxide, antimony pentoxide, sodium antimonate, and zinc borate.

9. An article formed from the composition of claim 1.

10. An article of claim 9 suitable for surface mount technology applications.

TABLE 1

| | Composition Weight % | | | | | | Flammability | Peak |
|---|---|---|---|---|---|---|---|---|
| | 6T/66 | ZB | Tough | Mold rel. | Glass | Flame Ret | 1/32" | Temperature |
| Comparative Examples | | | | | | | | |
| Comp Ex 1 | 43.75 | 4.0 | 1.0 | 0.45 | 30 | 20.8 (a) | V0 | 235 C. |
| Comp Ex 2 | 40.55 | 4.0 | 1.0 | 0.45 | 30 | 24.0 (b) | V0 | 225 C. |
| Comp Ex 3 | 33.05 | 4.0 | 1.0 | 0.45 | 45 | 16.5 (a) | V0 | 230 C. |
| Comp Ex 4 | 30.58 | 4.0 | 1.0 | 0.45 | 45 | 19.0 (b) | V0 | 230 C. |
| Examples | | | | | | | | |
| Example 1 | 40.55 | 4.0 | 1.0 | 0.45 | 30 | 24.0 (c) | V0 | 250 C. |
| Example 2 | 42.05 | 4.0 | 1.0 | 0.45 | 30 | 22.5 (d) | V0 | 240 C. |
| Example 3 | 40.44 | 4.0 | 1.0 | 0.45 | 30 | 24.0 (e) | V0 | 250 C. |
| Example 4 | 32.05 | 4.0 | 1.0 | 0.45 | 45 | 17.5 (f) | V0 | 240 C. |
| Example 5 | 32.05 | 4.0 | 1.0 | 0.45 | 45 | 17.5 (f) | V0 | 240 C. |

(a) PDBS-80  Poly(bromo)styrene  Great Lakes Chemical Co.
(b) Saytex HP-7010  Brominated Polystyrene  Albemarle
(c) CP-44  Copolymer of GMA and Bromostyrene  60% Br, 2% GMA, 60000 Molecular Weight, Great Lakes
(d) CP-44  Copolymer of GMA and Bromostyrene  64% Br, 1% GMA, 18000 Molecular Weight, Great Lakes
(e) CP-44  Copolymer of GMA and Bromostyrene  60% Br, 1% GMA, 57000 Molecular Weight, Great Lakes
(f) CP-44  Copolymer of GMA and Bromostyrene  64% Br, 0.5% GMA, 16000 Molecular Weight, Great Lakes This testing demonstrates that the peak temperature without blistering increases for the polyamides tested using copolymers of GMA and bromostyrene as the flame retardant (instead of poly(bromo) styrene or brominated polystyrene). In particular, for polyamide compositions including 30 weight percent glass reinforcing agent the peak temperature increased from 225–235 C. to 240–250 C. and for compositions including 45 weight percent glass reinforcing agent from 230 C. to 240 C. This improvement is of particular significance in SMT applications.

11. The composition of claim 1 wherein said copolymer includes 0.1 to about 15.0 weight percent glycidyl(meth) acrylate.

12. The composition of claim 11 wherein said copolymer includes 0.5 to about 2.0 weight percent glycidyl(meth) acrylate.

* * * * *